(12) United States Patent
Kimura

(10) Patent No.: US 8,355,082 B2
(45) Date of Patent: Jan. 15, 2013

(54) METHOD OF CONTROLLING FIRST INFORMATION APPARATUS CONNECTABLE TO SECOND INFORMATION APPARATUS

(75) Inventor: Masatoshi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 12/274,605

(22) Filed: Nov. 20, 2008

(65) Prior Publication Data

US 2009/0190042 A1    Jul. 30, 2009

(30) Foreign Application Priority Data

Jan. 24, 2008 (JP) ................. 2008-014239

(51) Int. Cl.
H04N 7/00 (2006.01)
H04N 5/44 (2006.01)
H04N 5/445 (2006.01)
H04N 7/18 (2006.01)
G06F 13/12 (2006.01)
G06F 13/38 (2006.01)
G06F 3/00 (2006.01)
G06F 13/00 (2006.01)

(52) U.S. Cl. ............ 348/552; 348/734; 710/63; 725/38; 725/74

(58) Field of Classification Search .................. None
See application file for complete search history.

(56) References Cited

U.S. PATENT DOCUMENTS

| | | | |
|---|---|---|---|
| 6,526,581 B1 * | 2/2003 | Edson | 725/74 |
| 2004/0169590 A1 * | 9/2004 | Haughawout et al. | 340/825.72 |
| 2008/0098426 A1 * | 4/2008 | Candelore | 725/38 |
| 2008/0134237 A1 * | 6/2008 | Tu et al. | 725/38 |
| 2008/0172504 A1 * | 7/2008 | Kimura et al. | 710/63 |

FOREIGN PATENT DOCUMENTS

| | | |
|---|---|---|
| JP | 06-292266 | 10/1994 |
| JP | 11-015590 | 1/1999 |
| JP | 2002-268868 | 9/2002 |
| JP | 2005-136486 | 5/2005 |
| JP | 2006-268863 | 5/2006 |

OTHER PUBLICATIONS

Ohkita et al., "Device Synchronization among TV, DVD, and Notebook PC Using HDMI-CEC", Toshiba Review, Toshiba Corporation, Dec. 1, 2007, Vil.62, No. 12, pp. 70-73.
Japanese Notification of Reason(S) for Refusal dated Aug. 21, 2012 in corresponding Japanese Patent Application 2008-014239.

* cited by examiner

Primary Examiner — Jefferey Harold
Assistant Examiner — Sean Haiem
(74) Attorney, Agent, or Firm — Staas & Halsey LLP

(57) ABSTRACT

According to an aspect of an embodiment, a method of controlling a first information apparatus connectable to a second information apparatus having a display, the second information apparatus being capable of reproducing video image based on video information obtained from a remote source independently from the first information apparatus, the method has storing command code information of the second information apparatus in association with identification information of the second information apparatus, receiving a command indicating a power-on operation of the second information apparatus while the second information apparatus is connected to the first information apparatus, executing a software program upon confirmation of the command indicating the power-on operation of the second information apparatus in reference to the command code information and outputting image data produced by the software program to the second information apparatus so as to display an image corresponding to the image data on the display.

18 Claims, 14 Drawing Sheets

FIG. 4

| Button number | Input route | Channel number |
|---|---|---|
| 1 | GA | 1 |
| 2 | BS | 11 |
| 3 | GA | 3 |
| 4 | GA | 4 |
| 5 | BS | 13 |
| 6 | GA | 6 |
| 7 | AV input | - |
| 8 | GA | 8 |
| 9 | HDMI input | - |
| 10 | GA | 10 |
| 11 | BS | 15 |
| 12 | GA | 12 |

| Vender name | A company | B company | |
|---|---|---|---|
| Vender ID | 0x01 | 0x02 | ... |
| ↑ button | 0x0A | 0x0A | ... |
| ↓ button | 0x0B | 0x0B | ... |
| ← button | 0x0C | 0x0C | ... |
| → button | 0x0D | 0x0D | ... |
| Decide button | 0x0E | 0x0E | ... |
| Blue button | 0x90 | 0x90 | ... |
| Red button | 0x91 | 0x91 | ... |
| Green button | 0x92 | 0x92 | ... |
| Yellow button | 0x93 | 0x93 | ... |
| Return button | 0x01 | 0x2C | |
| Menu button | - | 0x04 | |
| Sub menu button | 0x03 | - | |
| Reproduce button | - | 0x06 | |
| Input switch button | 0x81 | 0x52 | |
| First button | 0x71 | 0x61 | ... |
| Second button | 0x72 | 0x62 | ... |
| ... | | | |

| Television operation information | Application name |
|---|---|
| Power on | Jukebox |
| Root menu demand | Video player |

3408, 3410

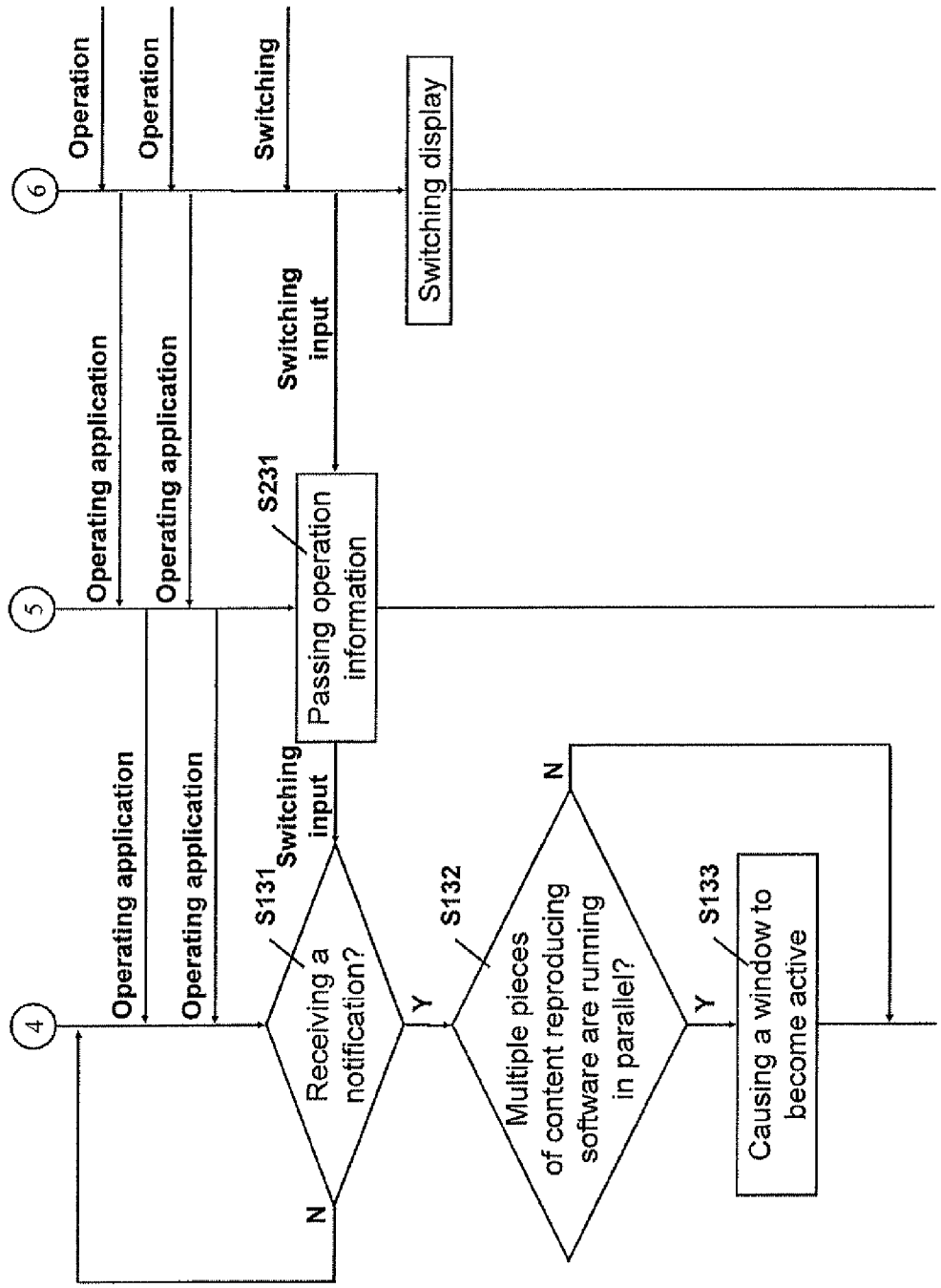

METHOD OF CONTROLLING FIRST INFORMATION APPARATUS CONNECTABLE TO SECOND INFORMATION APPARATUS

BACKGROUND

The present art relates to an information apparatus for reproducing content.

There is an information apparatus for executing a software program for reproducing content. A user can view or listen to arbitrary content on a computer by running the application software on the computer and giving a content-reproduction instruction to a function realized by the application software.

By interconnecting an audio/video-signal output terminal of such a computer and an audio/video input terminal of a typical television apparatus, the user can also view/listen to, on the television apparatus, content that is reproduced on the computer by the application software.

However, when a television apparatus is used to view/listen to content reproduced on the computer by the application software, the user has to power on both the computer and the television apparatus and also has to perform an operation for launching the application software.

There are Japanese Laid-open Patent Publication No. 2006-268863, Japanese Laid-open Patent Publication No. 2005-136486, Japanese Laid-open Patent Publication No. 11-015590 and Japanese Laid-open Patent Publication No. 06-292266.

SUMMARY

According to an aspect of an embodiment, a method of controlling a first information apparatus connectable to a second information apparatus having a display, the second information apparatus being capable of reproducing video image based on video information obtained from a remote source independently from the first information apparatus, the method has storing command code information of the second information apparatus in association with identification information of the second apparatus, receiving a command indicating a power-on operation of the second information apparatus by the first information apparatus while the second apparatus is connected to the first apparatus, executing a software program upon confirmation of the command indicating the power-on operation of the second information apparatus by the first information apparatus in reference to the command code information and outputting image data produced by the software program from the first information apparatus to the second information apparatus so as to display an image corresponding to the image data on the display.

BRIEF DESCRIPTION OF THE DRAWINGS

FIG. 4 schematically shows a button setting table;

FIG. 8 schematically shows a code-group master table;

FIG. 9 schematically shows an assignment definition table;

FIG. 14 is a flow diagram of the sequence during the input switching.

DESCRIPTION OF THE PREFERRED EMBODIMENT

An aspect of an embodiment of the present art will be described below with reference to the accompanying drawings.

Figure 1:
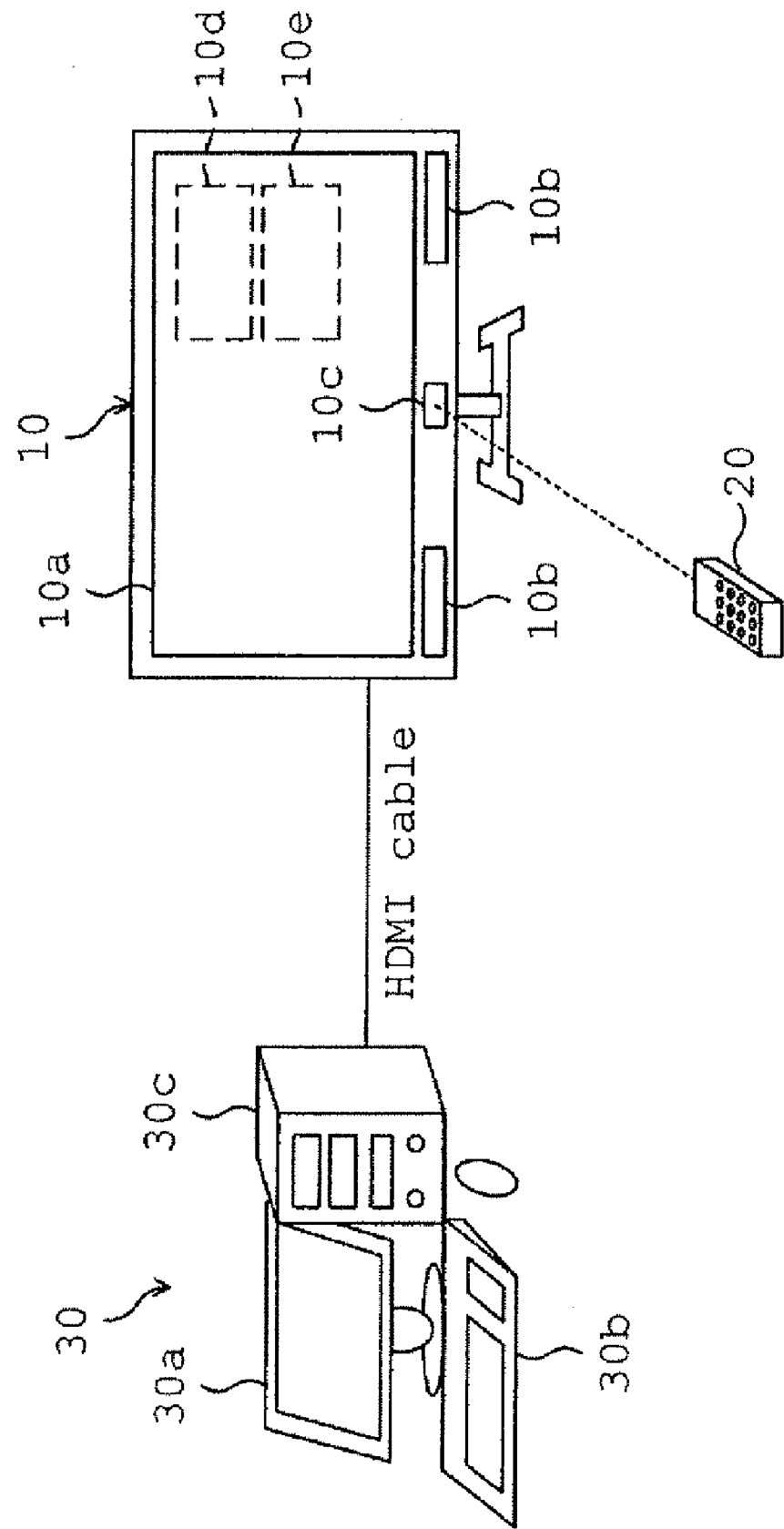
FIG. 1 a schematic view of an audio visual system according to an embodiment of the present art.

Configuration:

FIG. 1 is a schematic view of an audio visual system according to an embodiment of the present art.

As shown in FIG. 1, the audio visual system according to the embodiment includes a television apparatus 10, a remote controller 20, and a content-reproduction management apparatus 30.

As is well known, the television apparatus 10 performs output (e.g., audio output and display) of content, such as audio content and video content, on the basis of television signals (audio/video signals) output from each broadcast station in the form of radio waves or audio/video signals output from a known external output apparatus, such as a DVD (digital versatile disk) player. The television apparatus 10 has, on its housing, a display panel 10a, speakers 10b, and a light-receiving window 10c. The display panel 10a is a device for outputting video and the speakers 10b are devices for outputting audio. The light-receiving window 10c is a window for receiving modulation infrared light output from the remote controller 20. As is well known, the remote controller 20 is a device for outputting an operation signal in the form of modulation infrared light in response to a button operation performed by an operator. The television apparatus 10 further includes, in the housing, a signal processor 10d for processing the audio/video signals and a controller 10e for controlling the entire television apparatus 10.

Figure 2:
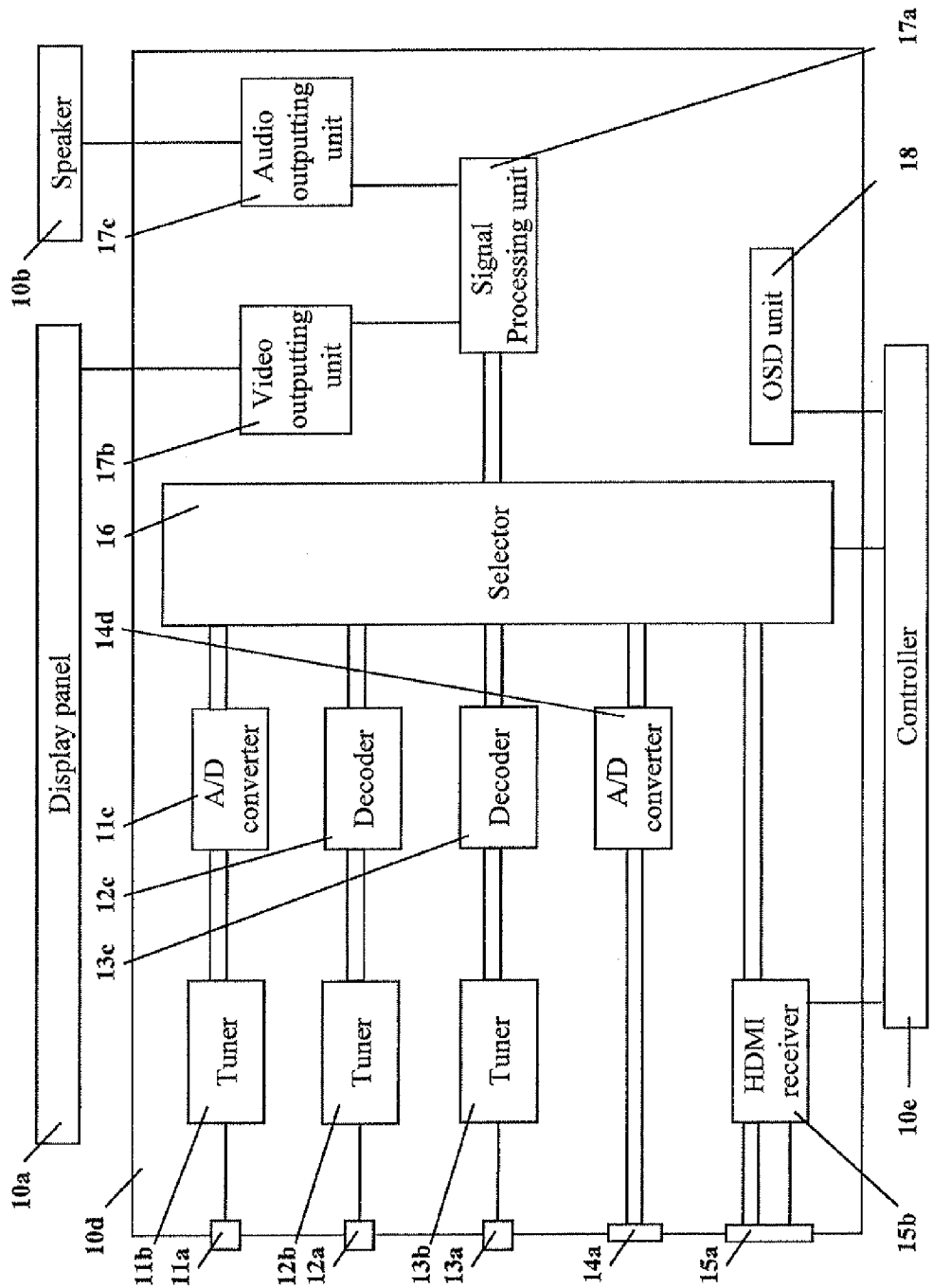
FIG. 2 is a block diagram of a signal processor.

FIG. 2 is a block diagram of the signal processor 10d.

As shown in FIG. 2, the signal processor 10d has first to third television-signal input terminals 11a, 12a, and 13a. The first television-signal input terminal 11a is an input terminal for connection with a ground-wave analog antenna for receiving television signals output from a broadcast station in the form of analog signals. The second television-signal input terminal 12a is an input terminal for connection with a ground-wave digital antenna for receiving television signals output from a broadcast station in the form of digital signals. The third television-signal input terminal 13a is an input terminal for connection with a BS (broadcast satellite) digital antenna for receiving television signals output from a broadcast satellite in the form of digital waves. As is well known, the television-signal input terminals 11a, 12a, and 13a are also connectable to a head-end apparatus in a facility of a cable television broadcast provider or a set-top box connected to the head-end apparatus through a CATV (community antenna television or cable television) network. The television-signal input terminals 11a, 12a, and 13a are connected to tuners 11b, 12b, and 13b, respectively. Each of the tuners 11b, 12b, and 13b extracts television signals of one channel of multiple channels which is specified by the controller 10e as a channel for viewing/listening. The television signals extracted by the tuner 11b are subjected to analog-to-digital (A/D) conversion by an A/D converter 11c and are input to a selector 16. The television signals extracted by the tuner 12b or 13b are decoded by a corresponding decoder 12c or 13c and are input to the selector 16.

The signal processor 10d further has one audio/video-signal input terminal 14a. The audio/video-signal input terminal 14a is an input terminal for connection with an audio/video output terminal of a known external output apparatus, such as a DVD player, a HDD (hard disk drive) recorder, a videogame machine, or a CATV set-top box. Audio/video signals input via the audio/video-signal input terminal 14a are subjected to analog-to-digital conversion by an AD converter 14c and are input to the selector 16.

The signal processor 10d further has an HDMI (high definition multimedia interface) input terminal 15a ("HDMI" is a trademark of HDMI Licensing, LLC). The HDMI input terminal 15a is an input terminal for connection with an HDMI output terminal of an external HDMI-output-capable output apparatus through an HDMI cable (see FIG. 1). The HDMI input terminal 15a is connected to an HDMI receiver 15b. The HDMI receiver 15b is a unit for receiving uncompressed audio/video signals from the HDMI-output-capable output apparatus, in accordance with an HDMI standard established by HDMI licensing, LLC and HDMI founders (including seven manufactures). Audio/video signals received by the HDMI receiver 15b via the HDMI input terminal 15a are also input to the selector 16.

In the HDMI standard, a CEC (consumer electronics control) standard for performing control for linking operations and functions of multiple pieces of equipment is prepared as an extended standard. The HDMI receiver 15b in the present embodiment is also adapted to exchange CEC signals with the external HDMI-output-capable output apparatus, in accordance with the CEC standard. The controller 10e is adapted such that it controls the operation of the external output apparatus and the operation of the television apparatus 10 is controlled thereby, by exchanging CEC information with the external output apparatus via the HDMI receiver 15b.

The selector 16 is connected to a signal processing unit 17a to couple one input route, selected by the controller 10e from five input routes (i.e., two routes passing through the AD converter 11c and 14c, two routes passing through the decoders 12c and 13c, and a one route passing through the HDMI receiver 15b), to the signal processing unit 17a. Although only five input routes are illustrated in FIG. 2, the television apparatus 10 may have six or more input routes. One example of other input routes is a route passing through a television-signal input terminal for CS (communication satellite) digital television broadcast. Alternatively, the number of input routes may be less than 5. That is, it is sufficient if the signal processor 10d has at least the route passing through the HDMI receiver 15b and another route. The other route is not limited to the type of route described above.

The signal processing unit 17a performs known processing on audio/video signals input through one route coupled by the selector 16. The signal processing unit 17a outputs video signals to a video outputting unit 17b and also output audio signals to an audio outputting unit 17c. The video outputting unit 17b displays video on the display panel 10a on the basis of the input video signals, and the audio outputting unit 17c outputs audio via the speakers 10b on the basis of the input audio signals.

The signal processor 10d further has an OSD (on screen display) unit 18. Upon receiving image data from the controller 10e, the OSD unit 18 performs processing on video signals, input from the signal processing unit 17a to the video outputting unit 17b, so that an image based on the image data is superimposed on video displayed on the display panel 10a.

Figure 3:
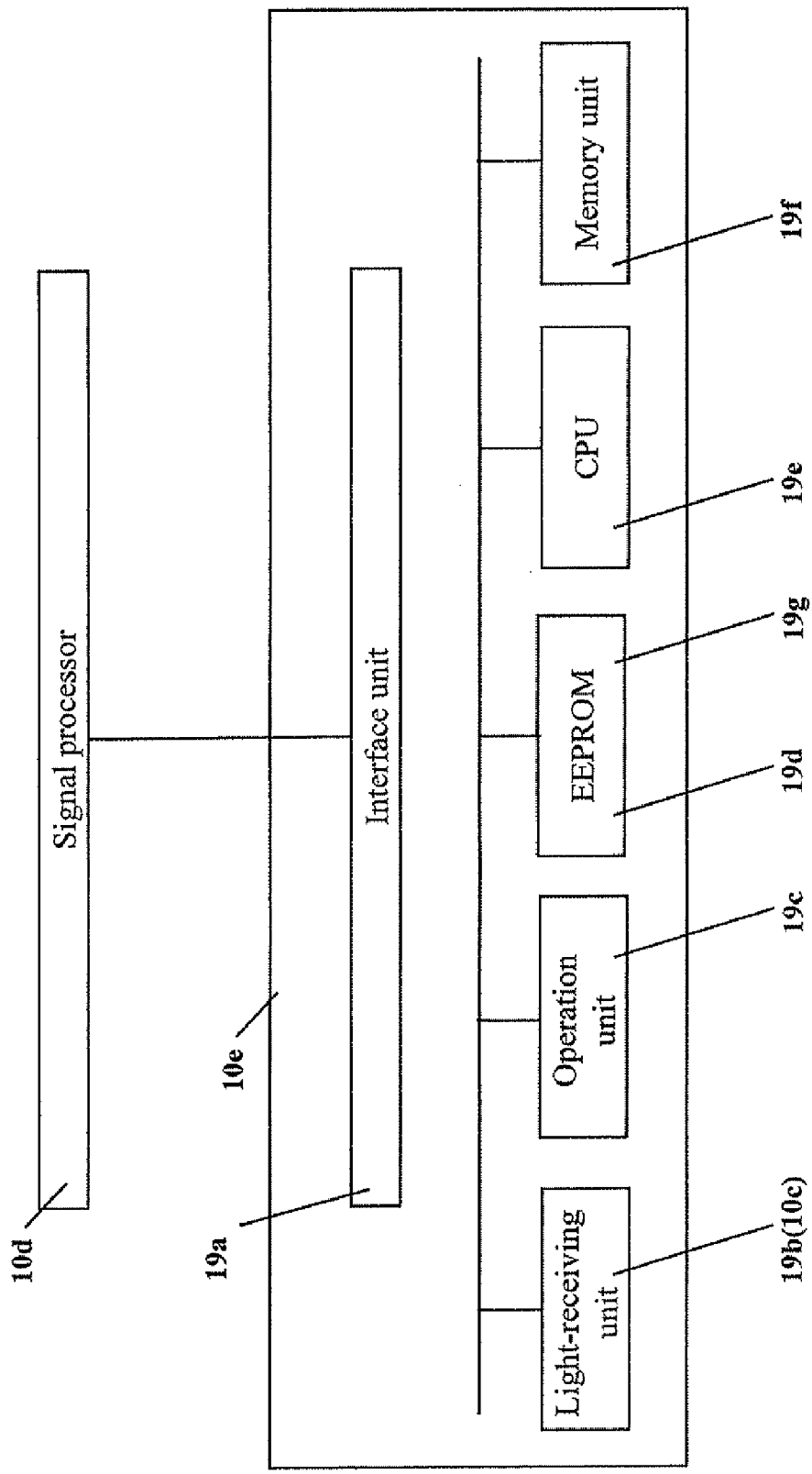
FIG. 3 is a block diagram of a controller.

FIG. 3 is a block diagram of the controller 10e.

As shown in FIG. 3, the controller 10e has an interface unit 19a, a light-receiving unit 19b, an operation unit 19c, an EEPROM (Electronically Erasable and Programmable Read Only Memory) 19d, a CPU (central processing unit) 19e, and a memory unit 19f.

The interface unit 19a is a unit for exchanging signals with some units in the signal processor 10d shown in FIG. 2.

The light-receiving unit 19b is a unit for receiving the modulation infrared light, output from the remote controller 20 as an operation signal, through the light-receiving window 10c. Upon receiving the operation signal from the remote controller 20, the light-receiving unit 19b passes operation information, represented by the operation signal, to the CPU 19e. When the remote controller 20 is one that uses a radio signal, which is a type of signal different from the infrared light, a known wireless receiving unit for the radio signal may be used as the light-receiving unit 19b.

The operation unit 19c is a unit for receiving an operation from the operator. Although not shown, the housing of the television apparatus 10 has an operation panel (not shown) for performing various operations, such as input switching, channel selection, sound-volume adjustment, image-quality adjustment, and button assignment. Upon receiving an operation from the operator via the operation panel, the operation unit 19c passes operation information corresponding to the received operation to the CPU 19e.

The EEPROM 19d is a unit in which various programs and various data are recorded in a readable/writable manner. The CPU 19e is a unit for performing processing in accordance with the program(s) recorded in the EEPROM 19d. The memory unit 19f is a unit used by the CPU 19e to cache a program and/or data or to provide a work area.

Although not shown, the controller 10e stores, in the EEPROM 19d, a program for receiving image-quality adjustment and button assignment from the operator via a setting screen. The program achieves a button assignment function, with which one input route selected by the selector 16 from the five input routes is assigned to one of, for example, 12 channel-selection numeric buttons provided on the remote controller 20. With respect to each one of the 12 numeric buttons which is assigned any of the three input routes that pass through the three tuners 11b, 12b, and 13b, one of multiple channels that are received by the tuner corresponding to the assigned input route is further assigned. Items selected using the numeric buttons on the remote controller 20 can also be selected by channel-selection up and down buttons provided on the operation panel (not shown). The button assignment function manages how the input routes and the channels are associated with the numeric buttons, by using a button setting table 19g stored in the EEPROM 19d.

FIG. 4 schematically shows the button setting table 19g.

As shown in FIG. 4, the button setting table 19g has records corresponding to the respective channel-selection numeric buttons on the remote controller 20. Each record has a "button number" field 1902, an "input route" field 1904 and a "channel number" field 1906.

The "button number" field 1902 is a field in which the number of the numeric button is recorded. The "input route" field 1904 is a field in which route identification information for identifying an input route assigned to the numeric button is recorded. In the present embodiment, the route identification information includes identification information for the GA (ground-wave analog) input route, the GD (ground-wave digital) input route, the BS (broadcast satellite) input route, the AV (audio/video) input route, and the HDMI input route. The "channel number" field is a field in which the number of, of all channels that are receivable by the tuner corresponding to the input route, a channel assigned to the corresponding numeric button is recorded, when the input route assigned to the numeric button is the GA, GD, or BS route. When the input route assigned to the numeric button is the AV input route or the HDMI input route, the "channel number" field in the record for the numeric button is blank.

According to the button setting table 19g shown in FIG. 4, when the operator presses the numeric button "7" or "9" on the remote controller 20, he or she can view/listen to content based on audio/video signals input via the audio/video-signal input terminal 14a or the HDMI input terminal 15a, not television signals received by any of the tuners.

As described above, the television apparatus 10 in the present embodiment allows the input routes passing through the input terminals 14a and 15a, other than the television-signal input terminals 11a, 12a, and 13a, to be assigned to any of the numeric buttons on the remote controller 20.

Upon receiving operation information from the light-receiving unit 19b or the operation unit 19c in the controller 10e of the television apparatus 10, the CPU 19e therein unilaterally outputs CEC information (such as a command or a button code) corresponding to the operation information via the HDMI receiver 15b in the signal processor 10d.

The television apparatus 10 described above is connected to the content-reproduction management apparatus 30 through the HDMI cable, as shown in FIG. 1. The content-reproduction management apparatus 30 may be a typical computer equipped with a content reproduction function. Thus, the content-reproduction management apparatus 30 includes output devices 30a such as a liquid-crystal display and speakers, operation devices 30b such as a keyboard and a mouse, a main unit 30c connected to the devices 30a and 30b. The main unit 30c has a function for outputting, as audio/video signals, reproduced content to the television apparatus 10 through the HDMI cable and a function for controlling the operation of the television apparatus 10 on the basis of the CEC information.

Figure 5:
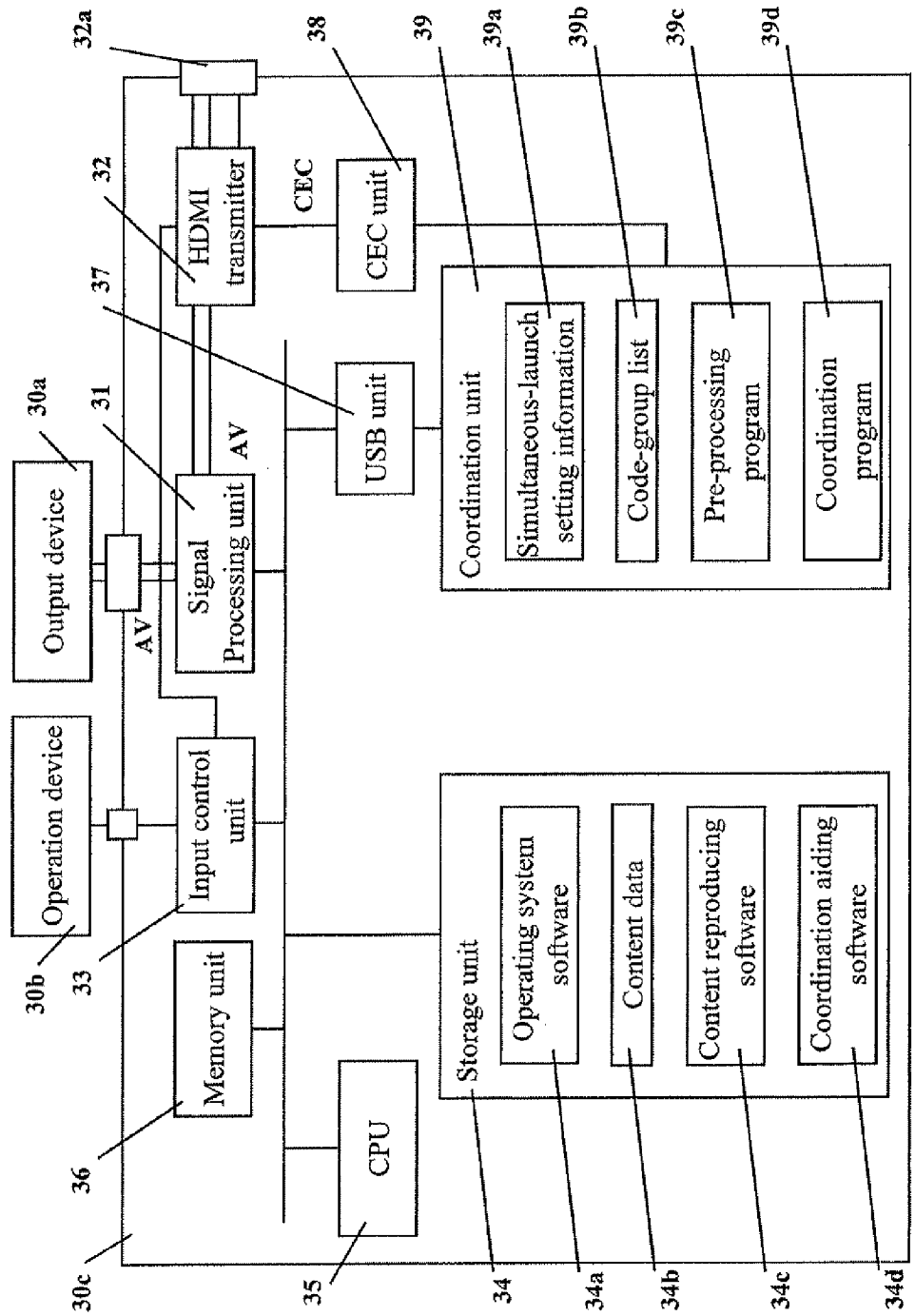
FIG. 5 is a block diagram of a main unit of a content-reproduction management apparatus.

FIG. 5 is a block diagram of the main unit 30c of the content-reproduction management apparatus 30.

As shown in FIG. 5, the main unit 30c of the content-reproduction management apparatus 30 includes a signal processing unit 31, an HDMI transmitter 32, an input control unit 33, a storage unit 34, a CPU 35, a memory unit 36, a USE (universal serial bus) unit 37, a CEC unit 38, and a coordination unit 39. The content-reproduction management apparatus 30 is connectable to a television apparatus 10 being capable of reproducing video image based on video information obtained from a remote source independently from the content-reproduction management apparatus 30.

The signal processing unit 31 is a unit for generating audio/video signals based on content data passed from the CPU 35. The signal processing unit 31 outputs the generated audio/video signals to the output device(s) 30a and/or the HDMI transmitter 32.

The HDMI transmitter 32 is a unit for transmitting uncompressed audio/video digital signals to an external input apparatus (i.e., the television apparatus 10 in the present embodiment) connected via an HDMI output terminal 32a, in accordance with the HDMI standard noted above. The HDMI transmitter 32 is also adapted to exchange CEC signals with the external input apparatus in accordance with the CEC standard note above. The coordination unit 39 is adapted such that it controls the operation of the external input apparatus and the operation of the content-reproduction management apparatus 30 is controlled thereby, by exchanging the CEC information with the external input apparatus via the HDMI transmitter 32. When a plug is connected to the HDMI output terminal 32a, the HDMI transmitter 32 has a function for detecting the connection and issuing a notification of the connection to the CPU 35 via the input control unit 33.

The input control unit 33 is a unit for receiving an operation from the operator via the operation device(s) 30b. Upon receiving an operation from the operator, the input control unit 33 passes operation information corresponding to the received operation to the CPU 35.

The storage unit 34 is a unit for recording various programs and various data. The CPU 35 is a unit for performing processing in accordance with the program(s) recorded in the storage unit 34. The memory unit 36 is a unit used by the CPU 35 to cache a program and/or data or to provide a work area.

The USB unit 37 is an interface unit for exchanging data with USB-compatible equipment in accordance with a USB standard. The USB unit 37 is connected to the coordination unit 39 through a USB cable.

The CEC unit 38 is an interface unit for exchanging data with CEC-compatible equipment in accordance with the CEC standard. The CEC unit 38 relays the CEC signals between the HDMI transmitter 32 and the coordination unit 39.

When an HDMI-receiver-equipped external input apparatus (the television apparatus 10 in the present embodiment) is connected to the HDMI transmitter 32 through the HDMI cable, the coordination unit 39 is adapted such that it controls the operation of the external input apparatus and the operation of the content-reproduction management apparatus 30 is controlled thereby, by exchanging the CEC information. The coordination unit 39 includes a USB interface, a CEC interface, an EEPROM, a CPU, and a memory, which are not shown. Even when the main unit 30c is in a standby state or in a power-off state, described below, power is constantly supplied to the coordination unit 39.

In the content-reproduction management apparatus 30 configured as described above, operating system software 34a is stored in the storage unit 34. The operating system software 34a is software for providing various applications with an API (application programming interface) and an ABI (application binary interface), managing storage areas in the storage unit 34 and the memory unit 36, managing processes and tasks, providing applications with utilities such as a file manager, various setting tools, and an editor, and assigning windows to multiple tasks for outputting multiple screens.

The operating system software 34a in the present embodiment may have a function for maintaining a non-input state for a certain period of time or for changing the operation state of the main unit 30c from the power-on state to the standby state on the basis of a predetermined explicit instruction. The expression "power-on state" refers to a normal operation state in which the inherent processing functions of the main unit 30c are executable. In the standby state, while holding information in the memory unit 36, the main unit 30c turns off power for other hardware, so that the amount of power consumption is reduced. As described above, however, the power for the coordination unit 39 is not turned off even in the standby state. In the standby state, when the CPU 35 receives a predetermined interruption, the power for the other hardware is turned on to cause the main unit 30c to return to the power-on state. The coordination unit 39 corresponds to a power controlling section.

In the content-reproduction management apparatus 30, multiple pieces of content data 34b and multiple pieces of content reproducing software 34c are stored in the storage unit 34. The content data 34b are data for displaying content, such as audio content, moving-image content, and still-image content. Examples of the content data include MIDI (Musical Instrument Digital Interface) data ("MIDI" is a trademark of Association of Musical Electronics Industry (Japan) and MIDI Manufactures Association (USA)), MP3 (MPEG audio layer-3) data, WAVE data, bitmap data, GIF (a service mark of CompuServe Inc.) data, PNG (Portable Network Graphics) data, JPEG (Joint Photographic Experts Group) data, MPEG data, MP4 data, and DV (digital video) data. The content reproducing software 34c is application software for reproducing content based on the content data 34b.

In the content-reproduction management apparatus 30, coordination aiding software 34d is stored in the storage unit 34. The coordination aiding software 34d is software for aiding the operation of the coordination unit 39.

Figure 6:
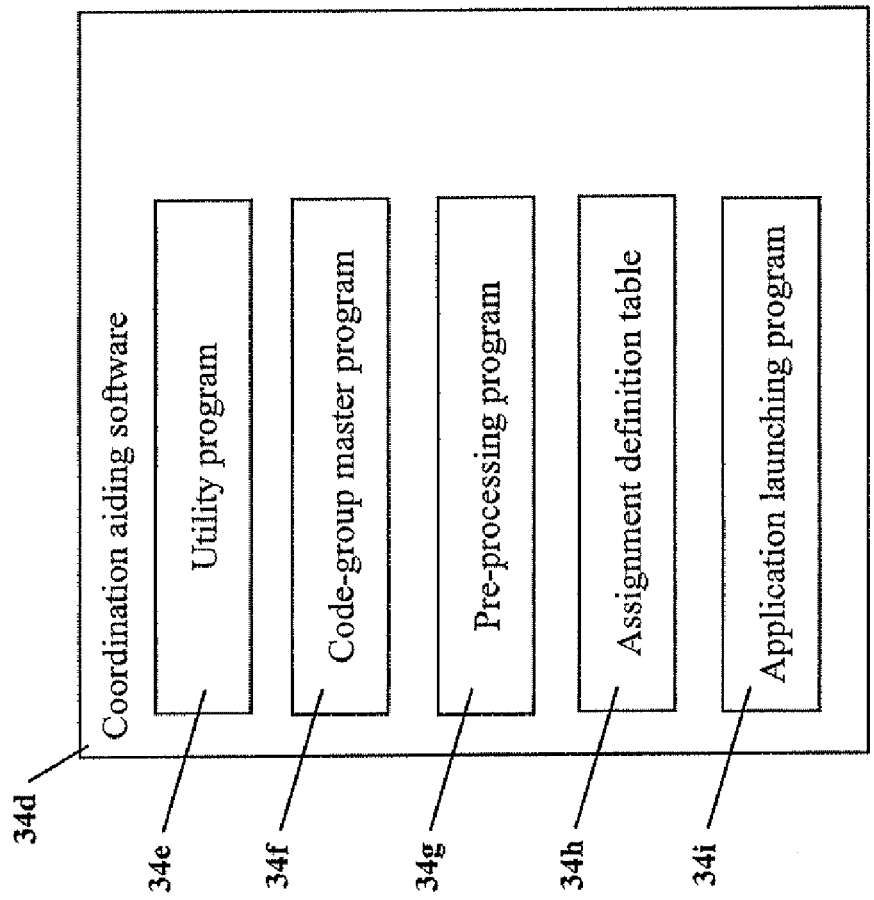
FIG. 6 is a diagram of the configuration of coordination aiding software.

FIG. 6 is a diagram of the configuration of the coordination aiding software 34d.

As shown in FIG. 6, the coordination aiding software 34d contains a utility program 34e, a code-group master table 34f, a pre-processing program 34g, an assignment definition table 34h, and an application launching program 34i.

The utility program 34e is a program for receiving, from the operator, information indicating whether or not the function of the coordination unit 39 is to be enabled and for registering the information with the coordination unit 39. When the operator launches the utility program 34e, it causes the CPU 35 to display a setting screen on the output device 30a.

Figure 7:
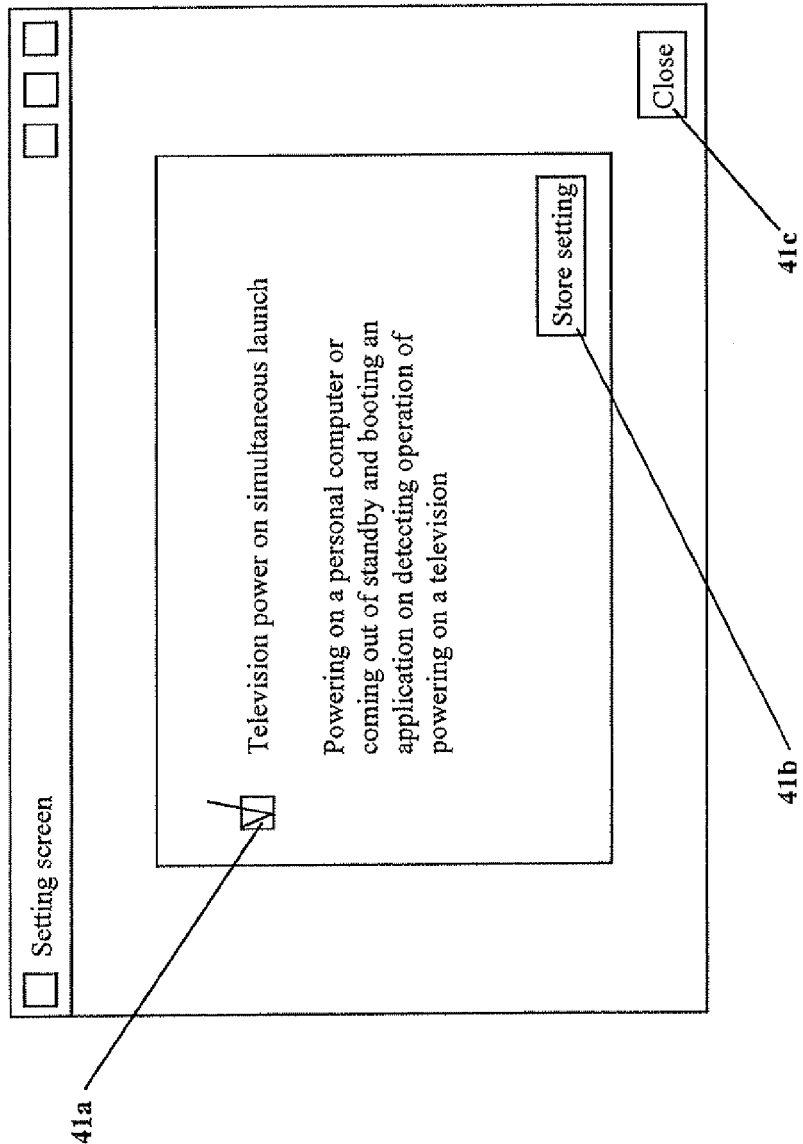
FIG. 7 is a schematic view showing one example of a setting screen.

FIG. 7 shows one example of a setting screen 41.

The setting screen 41 shown in FIG. 7 has one checkbox 41a. When the HDMI input terminal 15a of the television apparatus 10 is connected to the HDMI output terminal 32a, the checkbox 41a allows the operator to specify whether to enable or disable a simultaneous-launch function with which the predetermined content reproducing software 34c is launched upon being triggered by an operation for turning on the power for the television apparatus 10. For enabling the function, a checkmark is input to the checkbox 41a. The setting screen 41 shown in FIG. 7 further has two buttons 41b and 41c. The button 41b is a "store" button with which the operator can give an instruction for storing simultaneous-launch setting information corresponding to the input state of the checkmark in the checkbox 41a. The simultaneous-launch setting information is setting information indicating whether to enable or disable the above-described simultaneous-launch function. In response to clicking of the "store" button 41b, the simultaneous-launch setting information is stored, as the simultaneous-launch setting information 39a, in the EEPROM (not shown) in the coordination unit 39, or is overwritten to the simultaneous-launch setting information 39a already stored in the EEPROM. The button 41c is a "finish" button with which the user can give an instruction for finishing the setting work.

The CPU 35, which executes the utility program 34e, corresponds to a receiving section.

The code-group master table 34f shown in FIG. 6 is a table for recording a group of button codes for identifying the buttons on the remote controller 20 for each vender of the remote controller 20.

FIG. 8 is a table schematically showing the code-group master table 34f.

As shown in FIG. 8, each record in the code-group master table 34f has a "vender name" field 3402, a "vender ID (identification)" field, a "Up Arrow button" field, a "Down Arrow button" field, . . . , and so on. The "vender name" field 3042 is a field in which the name of a vender is recorded. The "vender ID" field is a field in which a vender code uniquely assigned to the vender is recorded as a vender ID. Each of the "Up Arrow button" field, the "Down Arrow button" field, . . . , and so on is a field in which a button code unilaterally outputted from the HDMI receiver 15b when the corresponding button on the remote controller 20 is pressed is recorded. When a corresponding button does not exist on the remote controller 20, the field for the button is blank. Command code information of the television apparatus 10 is stored in association with identification information of the television apparatus 10.

The pre-processing program 34g shown in FIG. 6 is a program for allowing the main unit 30c to communicate, when the HDMI transmitter 32 detects a plug connection to the HDMI output terminal 32a, with an external input apparatus (the television apparatus 10 in the present embodiment) physically connected via the plug. A description of processing executed by the CPU 35 in accordance with the pre-processing program 34g is given below with reference to FIG. 10.

The assignment definition table 34h shown in FIG. 6 is a table for pre-defining applications, which are to be launched when the coordination unit 39 detects that a predetermined operation is performed on the television apparatus 10.

FIG. 9 schematically shows the assignment definition table 34h.

As shown in FIG. 9, each record in the assignment definition table 34h has a "television operation information" field 3408 and an "application name" field 3410. The "television operation information" field 3408 is a field in which television operation information for specifying an operation to be detected by the television apparatus 10 is recorded. The "application name" field 3410 is a field in which the name of an application to be launched when the operation is detected is recorded. In the present embodiment, application software (which is "Jukebox" in the example of FIG. 9) for automatically reproducing content after the launch is set as the content reproducing software 34c that is launched upon being triggered by an operation for turning on the power for the television apparatus 10.

The application launching program 34i shown in FIG. 6 is a program for controlling the launch of the content reproducing software 34c in response to a notification from the coordination unit 39. A description of processing executed by the CPU 35 in accordance with the application launching program 34i is given below with reference to FIGS. 11 to 14.

The coordination unit 39 shown in FIG. 5 stores a code-group list 39b and a pre-processing program 39c in the EEPROM (not shown). The code-group list 39b is a list of a code group contained in one of the multiple records in the code-group master table 34f shown in FIG. 8. The pre-processing program 39c is a program for storing the code-group list 39b in the coordination unit 39 in cooperation with the pre-processing program 34g (see FIG. 6) in the coordination aiding software 34d. When the plug is disconnected from the HDMI output terminal 32a, the code-group list 39b is deleted from the EEPROM (not shown) in the coordination unit 39.

The coordination unit 39 shown in FIG. 5 also stores a coordination program 39d in the EEPROM (not shown). When the HDMI output terminal 32a is connected to an HDMI input terminal (the HDMI input terminal 15a in the present embodiment) of an external input apparatus, the coordination program 39d monitors an operation performed on the external input apparatus on the basis of the CEC information unilaterally output from the external input apparatus. Also, when a predetermined operation is performed on the external input apparatus, the coordination program 39d performs processing corresponding to the operation. A description of processing executed by the CPU 35 in accordance with the coordination program 39d is described below with reference to FIGS. 11 to 14.

Processing:

A description of processing performed by the main unit 30c and the coordination unit 39 in the content-reproduction management apparatus 30 and the television apparatus 10 will be described below.

Figure 10:
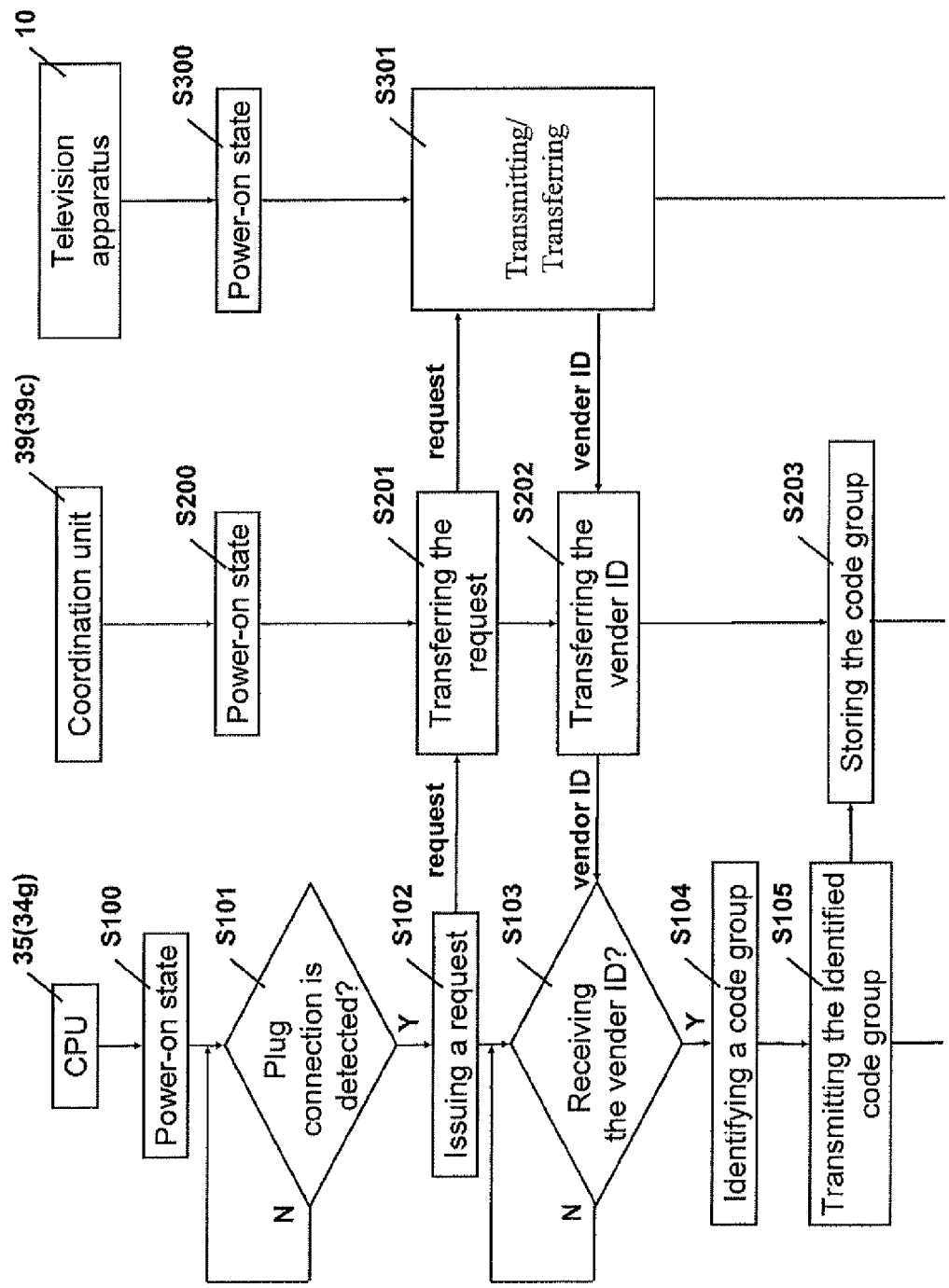
FIG. 10 is a flow diagram of a sequence during pre-processing.

Pre-Processing:

FIG. 10 is a flow diagram showing a sequence during pre-processing.

The pre-processing is processing performed when the main unit 30c and the television apparatus 10 are interconnected through the HDMI cable. When the main unit 30c is powered on, the CPU 35 is adapted to launch the pre-processing program 34g to start the pre-processing. When the main unit 30c is in the power-on state (step S100), after the start of the pre-processing, the CPU 35 stands by (N in step S101) until it receives a notification indicating the detection of a plug connection from the HDMI transmitter 32.

Upon receiving the notification indicating the detection of a plug connection from the HDMI transmitter 32 (Y in step S101), the CPU 35 issues a request for the vender ID held by the HDMI-connected external input apparatus to the coordination unit 39 in step S102, and then stands by (N in step S103) until the CPU 35 receives the vender ID from the coordination unit 39.

On the other hand, when the power is turned on, the CPU (not shown) in the coordination unit 39 is also adapted to launch the pre-processing program 39c to start the pre-processing. In the power-on state (step S200), after starting the pre-processing, when the coordination unit 39 (specifically, the CPU (not shown) therein) receives the request for the vender ID held by the HDMI-connected external input apparatus from the CPU 35, in step S201, the coordination unit 39 (specifically, the CPU (not shown) therein) transfers the request to the controller 10e in the television apparatus 10 through an HDMI interface (i.e., the HDMI transmitter 32, the HDMI cable, and the HDMI receiver 15b) in a format according to the CEC standard.

In the power-on state (step S300), the controller 10e in the television apparatus 10 transmits the vender ID held thereby to the coordination unit 39 through the HDMI interface in accordance with the CEC standard (step S301). Upon receiving the vender ID from the controller 10e, the coordination unit 39 transfers the vender ID to the CPU 35 in step S202.

Upon receiving the vender ID from the coordination unit 39, the CPU 35 in the main unit 30c uses the vender ID as a search condition to search the code-group master table 34f shown in FIG. 8 and detects one of the records therein to identify a code group in step S104.

Thereafter, in step S105, the CPU 35 transmits the identified code group to the coordination unit 39. Upon receiving the code group from the CPU 35, in step S203, the coordination unit 39 stores the code group in the EEPROM (not shown) as the code-group list 39b.

As described above, when the pre-processing programs 34g and 39c are running on the main unit 30c and the coordination unit 39, respectively, the HDMI transmitter 32 detects a plug connection and then the group of codes used by the remote controller 20 and the television apparatus 10 connected to the HDMI transmitter 32 is set in the coordination unit 39. Consequently, the coordination unit 39 can identify an operation performed on the television apparatus 10, on the basis of the button code unilaterally output from the television apparatus 10 as the CEC information.

Figure 11:
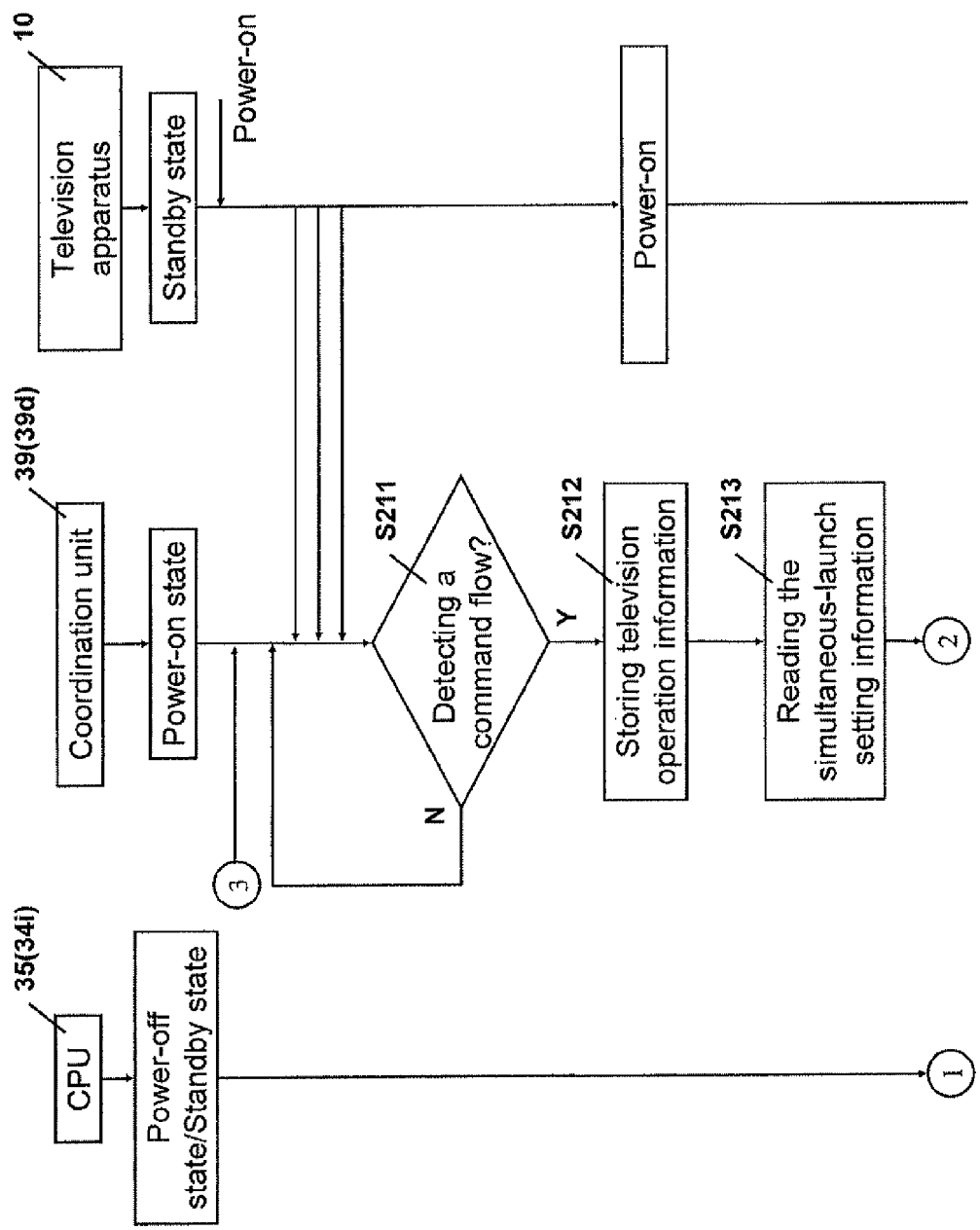
FIG. 11 is a flow diagram of a sequence during power-on of a television apparatus.
Figure 12:
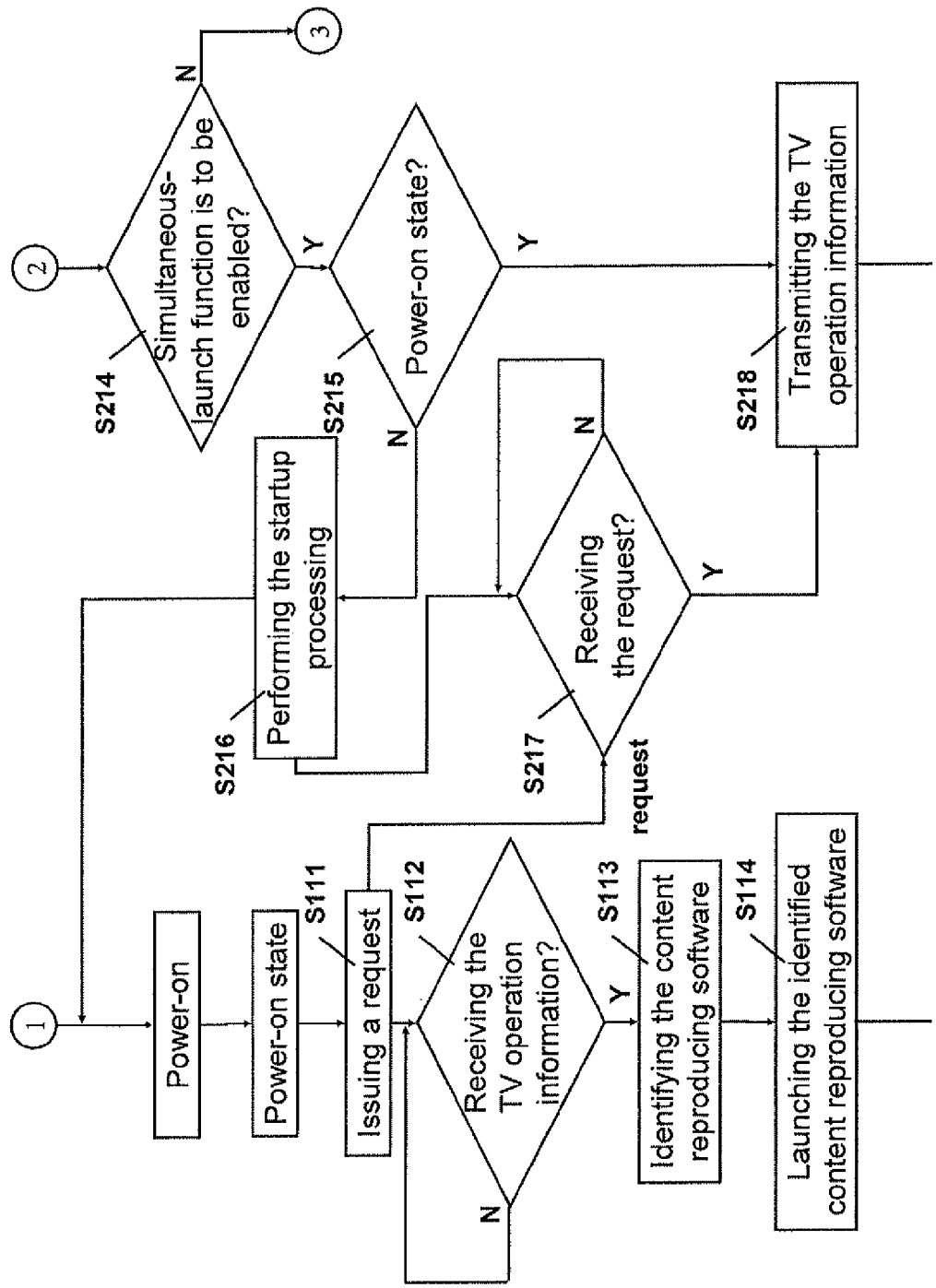
FIG. 12 is a flow diagram of the sequence during the power-on of the television apparatus.

Power On of Television Apparatus:

FIGS. 11 and 12 are flow diagrams showing a sequence during power-on of the television apparatus 10.

Before the sequence shown in FIGS. 11 and 12 is executed, the main unit 30c and the coordination unit 39 in the content-reproduction management apparatus 30 complete the above-described pre-processing shown in FIG. 10 and the code-group list 39b is already stored in the coordination unit 39. Further, the main unit 30c is in the power-off state or in the standby state and the television apparatus 10 is in the standby state. The coordination program 39d in the coordination unit 39 is already launched by the CPU (not shown) to start coordination processing.

When the operator presses a power-state switching button (the so-called "power button" (not shown)) on the remote controller 20 to cause an operation signal indicating switching to the power-on state to be input from the remote controller 20 to the television apparatus 10, the controller 10e in the television apparatus 10 performs handshake processing, the contents of which correspond to the switching to the power-on state, with the coordination unit 39 through the HDMI interface.

The contents (e.g., a command flow determined from a combination and a sequence of commands) of the handshake processing vary for each vender Thus, after the coordination processing is started, in step S211, the coordination unit 39 (specifically, the CPU (not shown) therein) monitors commands that are sequentially inputted through the HDMI interface. Upon detecting a command flow corresponding to the switching to the power-on state (Y in step S211), the process proceeds to step S212. In step S212, the coordination unit 39 stores, in the memory (not shown), television operation information indicating the operation of powering on the television apparatus 10. The content-reproduction management apparatus 30 receives a command indicating a power-on operation of the television apparatus 10 while the television apparatus 10 is connected to the content-reproduction management apparatus 30.

The coordination unit 39 (specifically, the CPU (not shown) therein), which executes steps S211 and S212, and the HDMI transmitter 32 correspond to a detecting section.

Subsequently, in step S213, the coordination unit 39 reads the simultaneous-launch setting information 39a from the memory (not shown). In step S214, the coordination unit 39 determines whether or not the simultaneous-launch setting information 39a indicates that the above-described simultaneous-launch function is to be enabled. When the simultaneous-launch setting information 39a does not indicate that the simultaneous-launch function is to be enabled (N in step S214), the coordination unit 39 does not perform any processing and returns to step S211 in which it monitors commands that are sequentially input through the HDMI interface.

On the other hand, when the simultaneous-launch setting information 39a indicates that the simultaneous-launch function is to be enabled (Y in step S214), the coordination unit 39 makes a determination in step S215 as to whether or not the main unit 30c is in the power-on state. When the main unit 30c is in the power-off state or in the standby state (N in step S215), the coordination unit 39 issues a power-on instruction to the CPU 35 in the main unit 30c in step S216, and stands by (N in step S217) until it receives a request for television operation information.

On the other hand, when the main unit 30c is in the power-off state or in the standby state and receives the power-on instruction from the coordination unit 39, the CPU 35 turns on the internal hardware including the CPU 35. Thereafter, the CPU 35 launches the operating system software 34*a* and the application launching program 34*i* (see FIG. 6) to start application launch processing.

After starting the application launch processing, in step S111, the CPU 35 issues a request for the television operation information stored in the coordination unit 39, and stands by (N in step S112) until the CPU 35 receives the television operation information.

Upon receiving the request for the television operation information (Y in step S217), the coordination unit 39 transmits the television operation information, stored in the memory (not shown), to the CPU 35 in step S218. When the CPU 35 receives the television operation information (Y in step S112), the process proceeds to step S113. In step S113, the CPU 35 uses the television operation information as a search condition to search the assignment definition table 34*h* shown in FIG. 9 and reads the names of the content reproducing software 34*c* from the "application name" fields in detected records to identify the content reproducing software 34*c* to be launched. The television operation information received from the coordination unit 39 and stored in the memory (not shown) in step S212 is information that indicates the operation of powering on the television apparatus 10, as described above, and thus, the CPU 35 identifies the application software (which is "Jukebox" in FIG. 9) that automatically reproduces content after the launch thereof.

Thereafter, in step S114, the CPU 35 launches the identified content reproducing software 34*c*. In response, the CPU 35 passes predetermined content data to the signal processing unit 31 in accordance with the content reproducing software 34*c*, generates audio/video signals based on the content data, and outputs the audio/video signals to the television apparatus 10 through the HDMI interface. The content-reproduction management apparatus 30 executes a software program upon confirmation of the command indicating the power-on operation of the television apparatus 10 in reference to the command code information and outputs image data produced by the software program to the television apparatus 10 so as to display an image corresponding to the image data on the display panel 10*a*.

The coordination unit 39 (specifically, the CPU (not shown) therein), which executes steps S213 to S218, and the CPU 35, which executes steps S111 to S114, correspond to a launching section. The signal processing unit 31 and the HDMI transmitter 32 correspond to an outputting section.

When the simultaneous-launch setting information 39*a* indicates that the simultaneous-launch function is to be enabled (Y in step S214) and the main unit 30*c* is in the power-on state (Y in step S215), the coordination unit 39 immediately transmits the television operation information, stored in the memory (not shown), to the CPU 35 in step S218 without performing the startup processing (steps S216 and S217) for the main unit 30*c*. When the main unit 30*c* is in the power-on state, the CPU 35 is in a state in which it has already started the application launch processing and stands by (N in step S112) until it receives the television operation information. Thus, upon detecting that an operation of powering on the television apparatus 10 is performed, the coordination unit 39 may immediately transmits the television operation information to the CPU 35. Even when the CPU 35 receives the television operation information, in such a manner, in step S113, it identifies the content reproducing software 34*c* to be launched, on the basis of the assignment definition table 34*h* shown in FIG. 9, and launches the identified content reproducing software 34*c* in step S114.

As described above, the application launching program 34*i* and the coordination program 39*d* are executed by the main unit 30*c* and the coordination unit 39, respectively. Thus, in a case in which the operation of powering on the television apparatus 10 is performed through the operation of the power-state switching button on the remote controller 20, when the main unit 30*c* is in the power-off state or in the standby state, the main unit 30*c* is switched into the power-on state and then the content reproducing software 34*c* is launched to cause audio/video signals to be output to the television apparatus 10 and, on the other hand, when the main unit 30*c* is in the power-on state, the content reproducing software 34*c* is immediately launched to cause audio/video signals to be output to the television apparatus 10.

Figure 13:
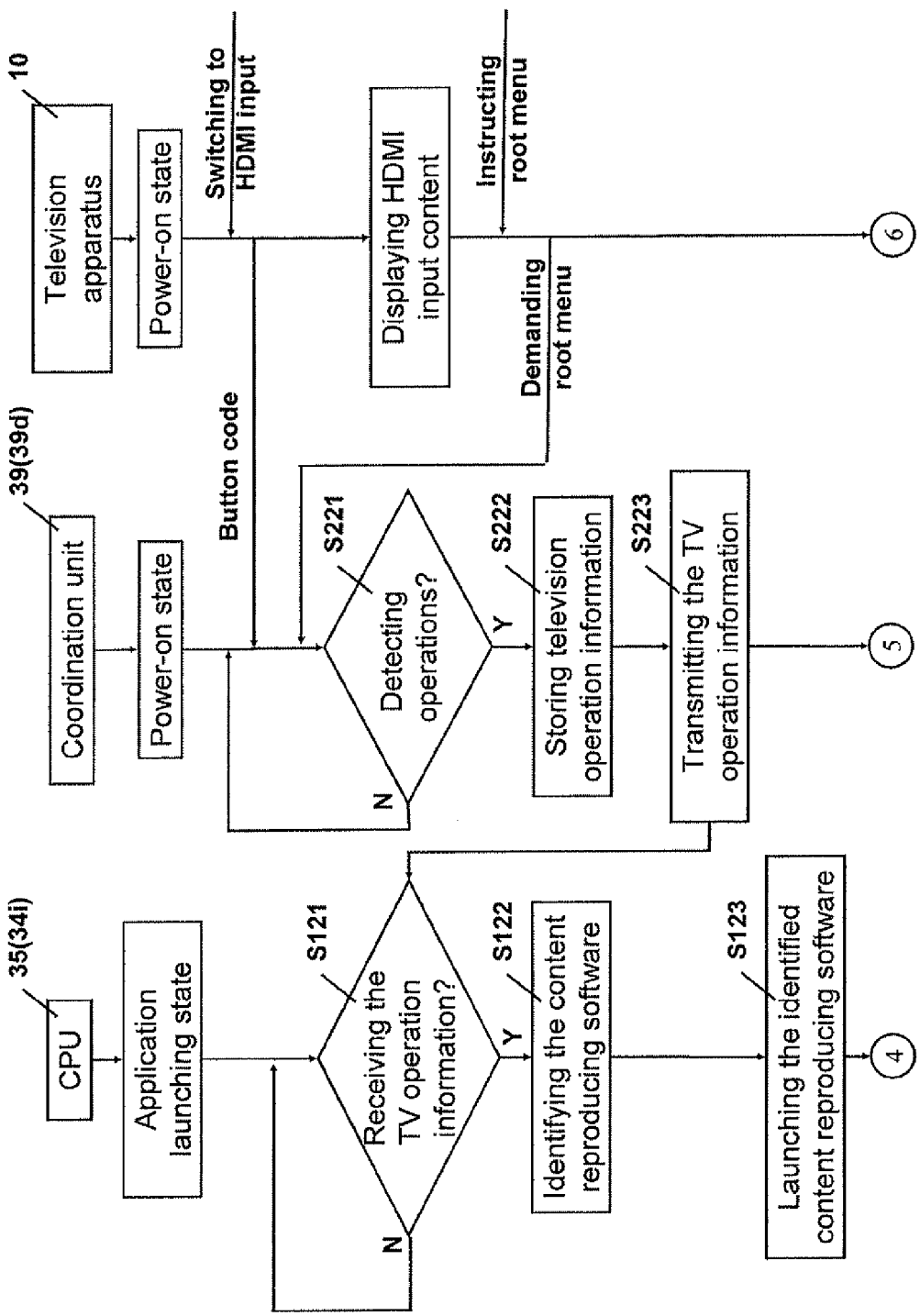
FIG. 13 is a flow diagram of a sequence during input switching.

Input Switching:

FIGS. 13 and 14 are flow diagrams showing a sequence during input switching.

Before the sequence shown in FIGS. 13 and 14 is executed, the main unit 30*c* and the coordination unit 39 in the content-reproduction management apparatus 30 complete the above-described processing shown in FIGS. 11 and 12, the content reproducing software 34*c* in the main unit 30*c* is already started, and the television apparatus 10 is in the power-on state. Also, the processing performed by the application launching program 34*i* and the processing performed by the coordination program 39*d* are continued.

When the operator presses the input switching button (not shown) on the remote controller 20 (e.g., presses the numeric button "9" on the remote controller 20, in the example shown in FIG. 4) to cause an operation signal indicating switching to the input route passing through the HDMI receiver 15*b* to be input from the remote controller 20 to the television apparatus 10, the controller 10*e* in the television apparatus 10 unilaterally outputs, through the HDMI interface, a button code indicating the switching to the input route passing through the HDMI receiver 15*b*. The controller 10*e* then controls the selector 16 (see FIG. 2) in the signal processor 10*d* to couple the HDMI receiver 15*b* with the signal processing unit 17*a*. In response, based on audio/video signals output from the content-reproduction management apparatus 30, content that is being reproduced by the content-reproduction management apparatus 30 is output from the display panel 10*a* and the speakers 10*b*.

In addition, when the operator presses, of the buttons on the remote controller 20, a button for outputting CEC information for requesting for "Root Menu" defined in the CEC standard, an operation signal indicating the "Root Menu" request is input from the remote controller 20 to the television apparatus 10.

In step S221, the coordination unit 39 (specifically, the CPU (not shown) therein) monitors commands that are sequentially input through the HDMI interface. When the coordination unit 39 detects both an operation of switching to the input route passing through the HDMI receiver 15*b* and an operation of outputting the CEC information indicating the "Root Menu" request (Y in step S221), the process proceeds to step S222. In step S222, the coordination unit 39 stores, in the memory (not shown), television operation information indicating calling of another application.

Subsequently, in step S223, the coordination unit 39 transmits the television operation information, stored in the memory (not shown), to the CPU 35. On the other hand, the CPU 35 stands by in step S121 until it receives the television operation information. When the CPU 35 receives the television operation information (Y in step S121), the process proceeds to step S122. In step S122, the CPU 35 uses the television operation information as a search condition to search the assignment definition table 34*h* shown in FIG. 9 and reads the names of the content reproducing software 34*c* from the "application name" fields of detected records to identify the content reproducing software 34c to be launched. In this case, since the television operation information received from the coordination unit 39 and stored in the CPU (not shown) in step S222 indicates the "Root Menu" request, the CPU 35 identifies the content reproducing software 34c (which is "Video Player" in the example of FIG. 9) that is different from the application software (which is "Jukebox" in FIG. 9) that automatically reproduces content after the launch thereof.

Thereafter, in step S123, the CPU 35 launches the identified content reproducing software 34c. At this point, therefore, two pieces of content reproducing software 34c are running on the main unit 30c in parallel. On the desktop, however, a window assigned to the subsequently launched content reproducing software 34c becomes active and audio/video signals associated with the previously launched content reproducing software 34c are not output from the signal processing unit 31.

In addition, when the operator presses an arrow button or an enter button on the remote controller 20, a button code corresponding to the pressed button is output from the remote controller 20 to the coordination unit 39 through the HDMI interface. On the basis of the code-grope list 39b, the coordination unit 39 identifies the button operated on the remote controller 20 and issues a notification indicating operation information corresponding to the identified button to the CPU 35. On the basis of the operation information, the CPU 35 operates the content reproducing software 34c having the active window. In this manner, using the remote controller 20, the operator can operate the content reproducing software 34c on the content-reproduction management apparatus 30 and can view/listen to, on the television apparatus 10, arbitrary content data 34b by selecting and reproducing the content data 34b.

Thereafter, when the operator presses an arbitrary button on the remote controller 20 to cause an operation signal indicating switching to an input route other than the input route passing through the HDMI receiver 15b to be input from the remote controller 20 to the television apparatus 10, the controller 10e in the television apparatus 10 unilaterally outputs, through the HDMI interface, a button code indicating the switching to the specified input route (i.e., the input route other than the input route passing through the HDMI receiver 15b). The controller 10e then controls the selector 16 (see FIG. 2) in the signal processor 10d to couple the specified input route to the signal processing unit 17a. In response, on the basis of audio/video signals input through the specified input route, content is output from the display panel 10a and the speakers 10b. That is, in the television apparatus 10, input switching is performed and display is switched to content (e.g., content of ground-wave analog television broadcast) other than the content reproduced by the content-reproduction management apparatus 30.

In step S231, when the operation signal indicating the input switching is input from the controller 10e in the television apparatus 10, the coordination unit 39 passes operation information indicating the input switching to the CPU 35.

In step S123 in FIG. 13, the CPU 35 launches the content reproducing software 34c in response to the switching to the input route passing through the HDMI receiver 15b. Thereafter, in step S131, the CPU 35 monitors a further notification indicating input switching. Upon receiving, from the coordination unit 39, a notification indicating switching to an input route other than the input route passing through the HDMI receiver 15b (Y in step S131), the process proceeds to step S132, in which the CPU 35 determines that multiple pieces of content reproducing software 34c are running in parallel. When multiple pieces of content reproducing software 34c are not running in parallel, the CPU 35 does not perform any processing and returns to the state in which it stands by (N in step S121) until it receives television operation information from the coordination unit 39.

On the other hand, when multiple pieces of content reproducing software 34c are running in parallel, the CPU 35 causes a window, assigned to the content reproducing software 34c (the default content reproducing software 34c) launched upon power-on of the television apparatus 10, to become active in step S133. Thereafter, the CPU 35 returns to the state in which it stands by (N in step S121) until television operation information is received from the coordination unit 39.

As described above, the application launching program 34i and the coordination program 39d are executed by the main unit 30c and the coordination unit 39, respectively. Thus, when the HDMI receiver 15b is selected as the input route for the selector 16 in the television apparatus 10 through an operation of the input switching button on the remote controller 20, content reproduced by the content-reproduction management apparatus 30 can be viewed/listened to using the television apparatus 10. When an operation for outputting CEC information indicating a "Root Menu" request is performed on the remote controller 20, another piece of content reproducing software 34c is launched to allow for the selection of the content data 34b via the remote controller 20. In addition, when an input route that does not pass through the HDMI receiver 15b is selected through an operation of the input switching button on the remote controller 20, display of the television apparatus 10 is switched and the window of the default content reproducing software 34c becomes active.

Unit Configuration:

In the embodiment described above, any of the units 31 to 39 in the main unit 30c of the content-reproduction management apparatus 30 may be constituted by software elements and hardware elements or may be constituted by only hardware elements.

Examples of the hardware elements include an interface program, a driver program, a table, and data, as well as a combination thereof The elements may be realized by those stored in a computer-readable medium, described below, or may be realized by firmware built into a storage device, such as a ROM (read only memory) and an LSI (large-scale integration) device.

Examples of the hardware elements include an FPGA (field programmable gate array), an ASIC (application specific integrated circuit), a gate array, a combination of logic gates, a signal processing circuit, an analog circuit, and other circuits. The logic gates of the exemplary elements may include an AND circuit, an OR circuit, a NAND circuit, a NOR circuit, a flip flop circuit, a counter circuit, and so on. The signal processing circuit may include circuit elements for executing addition, multiplication, division, inversion, product-sum operation, differentiation, integration, and so on of signal values. The analog circuit may include circuit elements for executing amplification, addition, multiplication, differentiation, integration, and so on.

The elements included in each of the units 31 to 39 in the main unit 30c of the content-reproduction management apparatus 30 are not limited to the above-described examples, and may be other elements that are equivalent thereto.

Software and Program:

In the above-described embodiment, any of the pre-processing program 39c, the coordination program 39d, and the coordination aiding software 34d included in the main unit 30c of the content-reproduction management apparatus 30, and the programs 34e, 34g, and 34i and the tables 34f and 34h included in the coordination aiding software 34d, as well as the aforementioned software elements may include elements, such as a software component, a procedural-language-based component, an object-oriented software component, a class component, a component managed as a task, a component managed as a process, a function, an attribute, a procedure (a protocol), a subroutine (a software routine), a program-code fragment or component, a driver, firmware, microcode, code, a code segment, an extra segment, a stack segment, a program area, a data area, data, a database, a data structure, a field, a record, a table, a matrix table, an array, a variable, and a parameter.

Any of the pre-processing program 39c, the coordination program 39d, and the coordination aiding software 34d included in the main unit 30c of the content-reproduction management apparatus 30, and the programs 34e, 34g, and 34i and the tables 34f and 34h included in the coordination aiding software 34d, as well as the aforementioned software elements may be written in C language, C++, Java (a trademark of Sun Microsystems, Inc.), Visual Basic (a trademark of Microsoft Corporation), Perl, Ruby, and any other programming language.

The pre-processing program 39c, the coordination program 39d, and the coordination aiding software 34d included in the main unit 30c of the content-reproduction management apparatus 30, and the programs 34e, 34g, and 34i and the tables 34f and 34h included in the coordination aiding software 34d, as well as commands included in the aforementioned software elements, code, and data may be transmitted to or loaded into a computer or a computer, integrated into a machine or apparatus, through a wired network card and a wired network or through a wireless card and a wireless network.

In the above-described transmission and loading, data signals are incorporated into, for example, carrier waves to travel through the wired network or the wireless network. The data signals, however, may be transferred in the form of the so-called "baseband signals", not in the form of the carrier waves. Such carrier waves are transmitted in an electrical, magnetic, or electromagnetic form, in the form of light or sound, or in another form.

The wired network or the wireless network is, for example, a telephone line, a network line, a cable (including an optical cable and/or a metal cable), a wireless link, a mobile-phone access line, a PHS (personal handyphone system) network, a wireless LAN (local area network), a Bluetooth (a trademark of the Bluetooth Special Interest Group) link, a vehicle-mounted wireless communication (including DSRC [dedicated short range communication]) link, and a network including some thereof. The data signals transmit information including a command, code, and data to a node or element on the network.

The elements included in the pre-processing program 39c, the coordination program 39d, and the coordination aiding software 34d included in the main unit 30c of the content-reproduction management apparatus 30, and the programs 34e, 34g, and 34i and the tables 34f and 34h included in the coordination aiding software 34d, as well as the aforementioned software elements are not limited to the above-described examples, and may be other elements that are equivalent thereto.

Computer-Readable Medium:

Any of the above-described functions according to the present embodiment may be transformed into code for storage in a storage area in a computer-readable medium. In this case, a program for realizing the functions can be supplied to a computer or a computer, integrated into a machine or apparatus, via the computer-readable medium. The computer or the computer integrated into the machine or apparatus can realize the functions by reading the program from the storage area in the computer-readable medium and executing the program.

The term "computer-readable medium" as used herein refers to a storage medium for storing information, such as a program and data, and keeping the information in a computer-readable state, by utilizing an electrical, magnetic, optical, chemical, physical, and/or mechanical effect.

One example utilizing the electrical or magnetic effect is writing data to elements on a ROM including fuses. One example utilizing the magnetic or physical effect is toner development to a latent image on a paper medium. Information recorded on the paper medium can be, for example, optically read. One example utilizing the optical and chemical effects is forming a thin layer or pits and bumps on a substrate. Information recorded in the form of pits and bumps can be, for example, optically read. Examples utilizing the chemical effect include oxidation-reduction reaction on a substrate, formation of an oxide or nitride layer on a semiconductor substrate, and photoresist development. Examples of the physical or mechanical effect include forming pits and bumps on an embossed card and punching holes in a paper medium.

Some computer-readable media can be removably loaded into computers or computers integrated into machines or apparatuses. Examples of such removably-loadable computer-readable media include DVDs (including DVD-R, DVD-RW, DVD+R, DVD+RW, DVD-ROM, and DVD-RAM), BDs (Blu-ray Discs, including BD-R, BD-RE, and BD-ROM), CDs (compact discs, including CD-R, CD-RW, and CD-ROM), MOs (magneto optical) disks, other optical disk media, flexible disks (including floppy disk ["Floppy" is a trademark of Hitachi, Ltd.]), other magnetic disk media, memory cards (including CompactFlash cards ["Compact-Flash" is a trademark of SanDisk Corporation], SmartMedia [a trademark of Toshiba Corporation], SD cards [jointly developed by SanDisk Corporation, Matsushita Electric Industrial Co., Ltd. and Toshiba Corporation], Memory Sticks [a trade mark of Sony Corporation], MMCs [a trademark of Siemens Corporation and SanDisk Corporation]), magnetic tapes, and other tape media, as well as storage devices incorporating any of those media. Some storage devices have built-in DRAMs (dynamic random access memories) or SRAM (static random access memories).

Some computer-readable media are fixedly installed in computers or computers integrated into machines or apparatuses. Examples of such computer-readable media include hard disks, DRAMs, SRAMs, ROMs, EEPROMs, and flash memories.

The present art has been conceived in view of the above-described situation, and an object of the present art is to allow content reproduced on a computer by application software to be easily viewed/listened to using a television apparatus.

In order to achieve the foregoing object, the present art provides a content-reproduction management apparatus. The content-reproduction management apparatus includes: a detecting section for detecting that a television apparatus is powered on, on the basis of an equipment-control signal input from the television apparatus via an equipment-control signal input/output terminal connected to the television apparatus; a launching section for launching application software for reproducing content, when the detecting section detects that the television apparatus is powered on; and an outputting section for outputting the content, reproduced by the application software launched by the launching section, from an audio/video signal output terminal connected to an audio/video signal input terminal of the television apparatus.

With this arrangement, when the television apparatus is powered on, the content is reproduced by the application software and the reproduced content is output to the television apparatus.

The operation associated with the content-reproduction management apparatus disclosed above can also be realized by a content-reproduction management method or a content-reproduction management program. That is, the present art may also be realized by a content-reproduction management method for causing a computer to execute, in multiple steps, functions that are equivalent to those of the sections (or units) of the content-reproduction management apparatus or may be realized by a content-reproduction management program for causing a computer to serve as multiple means that function similarly to the sections (or units) of the content-reproduction management apparatus.

Accordingly, the disclosed content-reproduction management apparatus allows content reproduced on a computer by application software to be easily viewed/listened to using a television apparatus.

What is claimed is:

1. A method of controlling a first information apparatus connectable to a second information apparatus having a display, the second information apparatus capable of reproducing video image based on video information obtained from a remote source independently from the first information apparatus, the method comprising:
storing command code information associated with identification information of the second information apparatus, the command code information including a plurality of combinations of command codes, each of the combinations being associated with each of a plurality of software programs;
receiving the identification information of the second information apparatus and the plurality of command codes transmitted from the second information apparatus by the first information apparatus, while the second information apparatus is connected with the first information apparatus;
executing a software program associated with the identification information and the plurality of combinations of command codes received, in reference to the command code information associated with the second information apparatus; and
outputting image data produced by the software program executed from the first information apparatus to the second information apparatus so as to display an image corresponding to the image data on the display.

2. The method of claim 1, comprising detecting a power-on operation by detecting a command flow of the power-on operation in a command flow received from the second information apparatus.

3. The method of claim 1, comprising receiving an instruction for whether to execute the software program.

4. The method of claim 3, wherein the executing determines whether to execute the software program on a basis of the instruction.

5. An information apparatus connectable to a first information apparatus having a display, the first information apparatus capable of reproducing video image based on video information obtained from a remote source independently from the information apparatus, the information apparatus comprising:

a storage storing command code information associated with identification information of the first information apparatus, the command code information including a plurality of combinations of command codes, each of the combinations being associated with each of a plurality of software programs; and
a processor receiving the identification information of the first apparatus and a plurality of command codes transmitted from the first information apparatus while the first information apparatus is connected with the information apparatus, executing a software program associated with identification information and the plurality of combinations of command codes received, in reference to the command code information associated with the first information apparatus and outputting image data produced by the software program executed by the processor to the first information apparatus so as to display an image corresponding to the image data on the display.

6. The information apparatus of claim 5, wherein the processor detects a power-on operation by detecting a command flow of the power-on operation in a command flow received from the first information apparatus.

7. The information apparatus of claim 5, wherein the processor receives an instruction for whether to execute the software program.

8. The information apparatus of claim 7, wherein the processor determines whether to execute the software program on a basis of the instruction.

9. A computer-readable recording medium that stores a computer program controlling a first information apparatus connectable to a second information apparatus having a display, the second information apparatus being capable of reproducing video image based on video information obtained from a remote source independently from the first information apparatus, according to a process comprising:
storing command code information associated with identification information of the second information apparatus, the command code information including a plurality of combinations of command codes, each of the combinations being associated with each of a plurality of software programs;
receiving the identification information of the second information apparatus and the plurality of command codes transmitted from the second information apparatus by the first information apparatus while the second information apparatus is connected to the first information apparatus;
executing a software program associated with the identification information and the plurality of the combinations of command codes received, in reference to the command code information associated with the second information apparatus; and
outputting image data produced by the software program executed from the first information apparatus to the second information apparatus so as to display an image corresponding to the image data on the display.

10. The computer-readable recording medium of claim 9, wherein the process comprises detecting a power-on operation by detecting a command flow of the power-on operation in a command flow received from the second information apparatus.

11. The computer-readable recording medium of claim 9, wherein the process comprises receiving an instruction for whether to execute the software program.

12. The computer-readable recording medium of claim 11, wherein the executing determines whether to execute the software program on a basis of the instruction.

13. The method of claim 1, wherein the associated identification information of the second information apparatus relates to a type of the second information apparatus.

14. The method of claim 1, wherein the executing of the software program changes based on the command code information associated with the second information apparatus.

15. The information apparatus of claim 5, wherein the associated identification information of the first information apparatus relates to a type of the first information apparatus.

16. The method of claim 1, wherein the software program executed changes based on the command code information associated with the first information apparatus.

17. The computer-readable recording medium of claim 9, wherein the associated identification information of the second information apparatus relates to a type of the second information apparatus.

18. The computer-readable recording medium of claim 9, wherein the executing of the software program changes based on the command code information associated with the second information apparatus.

* * * * *